(No Model.)
J. B. ANDERSON.
PORTABLE HEATING AND COOKING STOVE.
No. 395,730. Patented Jan. 8, 1889.
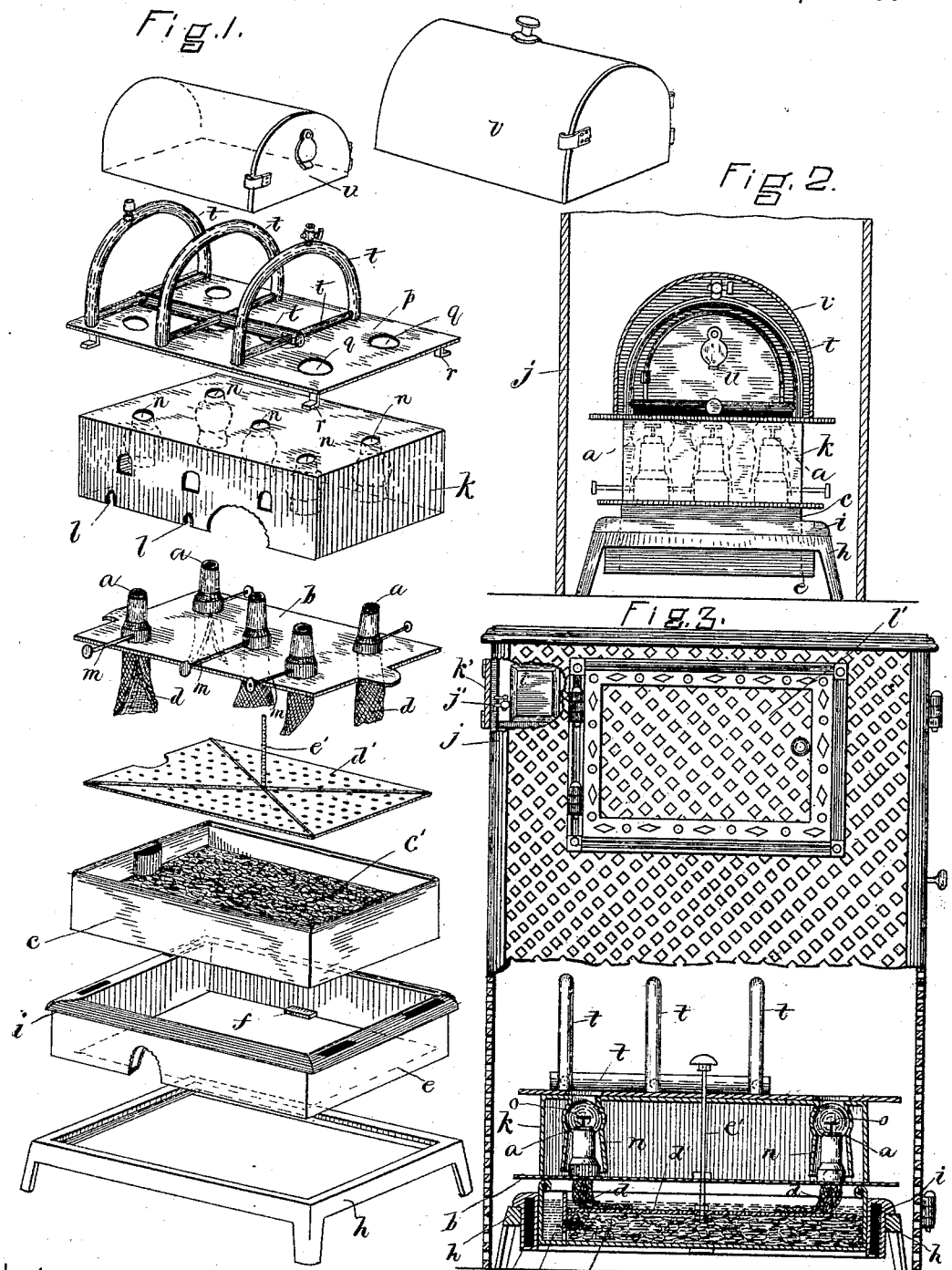

UNITED STATES PATENT OFFICE.

J. BURNHAM ANDERSON, OF BOSTON, MASSACHUSETTS, ASSIGNOR TO
GEORGE H. HEATH, OF SAME PLACE.

PORTABLE HEATING OR COOKING STOVE.

SPECIFICATION forming part of Letters Patent No. 395,730, dated January 8, 1889.

Application filed February 3, 1888. Serial No. 262,951. (No model.)

*To all whom it may concern:*

Be it known that I, J. BURNHAM ANDERSON, of Boston, in the county of Suffolk and State of Massachusetts, have invented certain new and useful Improvements in Portable Heating or Cooking Stoves, of which the following is a specification.

This invention has for its object to provide an efficient and convenient portable heating or cooking stove adapted to consume liquid or gaseous fuel; and it consists in the several improvements which I will now proceed to describe and claim.

Of the accompanying drawings, forming a part of this specification, Figure 1 represents a perspective view of my improved stove, the parts thereof being separated from each other. Fig. 2 represents a transverse section of the stove. Fig. 3 represents a longitudinal section of the stove and a side elevation of the upper portion of its casing.

The same letters of reference indicate the same parts in all the figures.

In the drawings, $a\ a\ a$ represent a series of Argand burners, which are here shown as constructed to burn kerosene-oil, and supported by a base or holder, $b$. Said holder is placed over a reservoir, $c$, adapted to contain oil, the wicks $d$ extending from said burners to the reservoir.

$e$ represents a casing formed to receive the oil-reservoir and provided with lugs $f$ to support the latter. Said casing is made hollow, so that the reservoir is surrounded by an air-space, (the interior of the casing,) which prevents heat from being readily imparted to the oil through the casing.

$h$ represents a base on which a flange, $i$, formed on the casing $e$, rests, the base supporting the reservoir and casing and all the other parts hereinafter described, excepting the outside casing, $j$.

$k$ represents a sheet-metal chamber, open at the bottom and formed to rest on the burner-holder, the sides of said chamber having slots $l\ l$ to receive the ratchet-rods $m$ of the burners $a$. To the top of said chamber are affixed flues or chimneys $n$, extending through said top and downwardly therefrom over the burners $a$. I prefer to form said chimneys with spherical enlargements at the point where the flame is enlarged by the button $o$ over the center of the burner, said button being arranged to enlarge the flame as in a lamp-burner now in general use.

$p$ represents a plate formed to rest on the top of the chamber, and provided with holes $q$, arranged to coincide with the chimneys $n$, said plate being held in place on the top of the casing by lugs $r$, attached to the plate and arranged to bear against the sides of the chamber.

To the upper side of the plate $p$ is attached a series of tubes, $t$, adapted to contain water. Said tubes, which are preferably of sheet metal—such as copper—are arranged to form a cage in which a portable oven, $u$, of semi-cylindrical or other suitable form, may be inserted. Portions of said cage are arranged over the holes $q$ in the plate $p$, so that the water in said cage will be heated by the burners $a$. The heating of the water deodorizes the products of combustion from the burners, so that no unpleasant odor can be perceived in the room. I believe this result to be due to the contact of the products of combustion with the heated surfaces of the pipes.

I have found by repeated tests that no unpleasant odor attends the combustion of oil in the stove provided with the sheet-metal tubes containing water.

The tubes conduct the heat around the oven $u$, so that the interior of the latter is thoroughly heated. I prefer to make the cage and oven shorter than the plate $p$, so as to leave one or more holes $q$ unobstructed for use in broiling or frying or to receive separate culinary vessels.

$v$ represents an open-bottomed cover formed to rest on the plate $p$ and cover the cage $t$ and whatever else may rest on the plate $p$, confining the heat. Said cover may have a hinged door at one end and a vent-opening at the top provided with a removable cover.

I prefer to place fibrous absorbent material, $a'\ c'$—such as wool—in the oil-reservoir $c$, and to place over said absorbent a perforated follower, $d'$, formed to nearly cover the area of the reservoir. Said follower is held down upon the absorbent material by a screw-threaded rod, $e'$, working in a tapped socket, constituting a fixed nut in the plate $b$. Said rod projects above the chamber $k$, so that it can be grasped and rotated to depress or raise the follower. The depression of the follower causes it to compress the absorbent material below the level of the oil, thus presenting a quantity of the latter to the wicks, the quantity depending on the extent of the depression of the follower. It will be seen, therefore, that the quantity of exposed oil can be easily regulated, and that only a small quantity need be exposed at any time, thus diminishing danger of accidents.

The parts above described may be inclosed in an ornamental casing or radiator, $j$, having perforated or open-work sides and a marble top. A water-reservoir, $i'$, may be secured to the interior of said casing at its upper portion, so that water may be kept hot without interfering with the stove. Said reservoir should have a faucet, $j'$, and the casing should have a door, $k'$, to permit access to the reservoir. The casing or radiator may have a hot-air closet in its upper portion provided with a door, $l'$.

When the stove is used only for heating, the oven $u$ and cover $v$ may be removed.

It is obvious that gaseous fuel may be used instead of liquid, gas-burners being substituted for the oil-burners here shown.

I claim—

1. The combination of a series of burners, a cage or frame composed of liquid-holding tubes arranged to be heated by said burners and inclosing a horizontal oven-receiving space, and a movable oven formed to be inserted in said space, as set forth.

2. The combination of a series of burners, a horizontal cage or frame composed of liquid-holding tubes arranged to be heated by said burners and inclosing a horizontal space, a movable oven formed to be inserted in said space, a removable cover formed to inclose said cage and oven, and a plate, $p$, provided with openings coinciding with the burners and arranged to support the oven, as set forth.

3. The reservoir $c$, having the fibrous absorbent material, combined with the perforated follower and means for depressing the same, as set forth.

4. The combination of the reservoir, the fibrous material thereon, the perforated follower, and the screw and fixed nut, whereby said follower may be depressed, as set forth.

5. The combination of the hollow casing $e$, having the outwardly-projecting flange $i$, the air-space, and the inwardly-projecting lugs or supports $f$, the base $h$, formed to support the casing by its flange $i$, and the reservoir $c$, formed to be inserted in the casing and to rest on the lugs $f$ thereof, as set forth.

6. The combination of the burners $a$, the chamber $k$, having the chimneys $n$ opening through its top, the plate $p$, having openings $q$ arranged to coincide with the chimneys, and the tubes $t\ l$ on said plate, formed into a hollow cage or oven-receptacle, all arranged and operating substantially as set forth.

In testimony whereof I have signed my name to this specification, in the presence of two subscribing witnesses, this 18th day of January, 1888.

J. BURNHAM ANDERSON.

Witnesses:
 C. F. BROWN,
 A. D. HARRISON.